United States Patent
Yen et al.

(10) Patent No.: US 8,032,466 B2
(45) Date of Patent: Oct. 4, 2011

(54) SYSTEM, METHOD, AND COMPUTER READABLE MEDIUM FOR MICROPAYMENT WITH VARYING DENOMINATION

(75) Inventors: Sung-Ming Yen, Taipei (TW);
Yen-Chang Chen, Fongshan (TW);
His-Chung Lin, Sijhih (TW); Jia Jum Hung, Jang-Hua (TW); Jui-Ming Wu, Yonghe (TW)

(73) Assignee: Institute for Information Industry, Taipei (TW)

( * ) Notice: Subject to any disclaimer, the term of this patent is extended or adjusted under 35 U.S.C. 154(b) by 1113 days.

(21) Appl. No.: 11/753,313

(22) Filed: May 24, 2007

(65) Prior Publication Data
US 2008/0147563 A1    Jun. 19, 2008

(30) Foreign Application Priority Data

Dec. 14, 2006 (TW) ................................ 95146902 A

(51) Int. Cl.
*G06Q 99/00* (2006.01)
(52) U.S. Cl. ........................................................ 705/75
(58) Field of Classification Search .................... None
See application file for complete search history.

(56) References Cited

U.S. PATENT DOCUMENTS

| 5,521,980 A * | 5/1996 | Brands | 380/30 |
| 6,327,578 B1 * | 12/2001 | Linehan | 705/65 |
| 7,620,606 B2 * | 11/2009 | Gentry et al. | 705/76 |
| 7,783,579 B2 * | 8/2010 | Gentry et al. | 705/69 |
| 2002/0128983 A1 * | 9/2002 | Wrona et al. | 705/71 |
| 2004/0059677 A1 * | 3/2004 | Shao | 705/51 |
| 2006/0059333 A1 * | 3/2006 | Gentry et al. | 713/156 |
| 2006/0137006 A1 * | 6/2006 | Ramzan et al. | 726/21 |
| 2007/0005499 A1 * | 1/2007 | Gentry et al. | 705/51 |
| 2007/0168297 A1 * | 7/2007 | Cheng et al. | 705/65 |
| 2008/0147563 A1 * | 6/2008 | Yen et al. | 705/65 |

FOREIGN PATENT DOCUMENTS

| JP | 11-110464 | 4/1999 |
| JP | 2001-338243 | 12/2001 |
| JP | 2002-268546 | 9/2002 |
| JP | 2003-216875 | 7/2003 |
| JP | 2003-317019 | 11/2003 |
| JP | 2005-311531 | 11/2005 |

OTHER PUBLICATIONS

Menezes et al., Handbook of Applied Cryptography, 1997, CRC Press, all pages.*

* cited by examiner

*Primary Examiner* — Andrew J. Fischer
*Assistant Examiner* — Jacob C. Coppola
(74) *Attorney, Agent, or Firm* — Patterson Thuente Christensen Pedersen P.A.

(57) ABSTRACT

A system, a method, and a computer readable medium for micropayment with varying denomination are disclosed. The method utilizes a secret value, a public information, a number base parameter, a bit parameter, and merged one-way hash chains to calculate a root for providing a certificate of a transaction among a customer, a merchant and a service device. Therefore, the purpose of varying denomination for micropayment system can be achieved and the trade safety and the efficiency during the transaction process can be enhanced as well.

1 Claim, 4 Drawing Sheets

SYSTEM, METHOD, AND COMPUTER READABLE MEDIUM FOR MICROPAYMENT WITH VARYING DENOMINATION

This application claims the benefit of priority based on Taiwan Patent Application No. 095146902 filed on Dec. 14, 2006, and the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a system, a method, and a computer readable medium for micropayment, specifically to a system, a method, and a computer readable medium for micropayment with varying denomination.

2. Descriptions of the Related Art

Micropayment schemes have received growing attention recently, primarily because that these schemes provide solutions for numerous Internet based applications, for example, on-line magazine subscription, on-line database query, access to charged World Wide Web pages, and Internet pop-up advertisement, etc. Micropayment schemes allow a customer to transfer to a merchant a sequence of small amount payments in exchange for services or electronic products from the merchant. Usually, it is inappropriate to pay the total amount of money either in advance or afterwards in some applications, and this makes micropayment schemes be especially useful. For the purpose of real time bargains of the micropayment system in the network, it is essential to emphasize efficiency and safety of on-line bargains.

Taking the present micropayment system as an example, the payment involving the on-line micropayment is small, while the frequency thereof is high. Accordingly, the corresponding computational cost and the storage cost must be reduced to provide an acceptable performance for users. However, under such circumstances, the above-mentioned efficiency and safety of on-line bargains is hard to maintain in the meantime.

According to the developing trend, there are three types of micropayment schemes: counting type, one-way hash chain type and signature type.

The micropayment schemes of the counting type uses a scheme of subtracting points from the counter of a customer and adding points of the counter of a merchant as well. The disadvantage of this scheme is low safety for customers. If a bargaining dispute occurred, few protection can be provided to customers.

As to the micropayment schemes of the one-way hash chain type, a fixed currency value is used. Therefore, the computational cost for calculating the one-way hash chain is high, the above-mentioned purposes of reducing the computational cost and the storage cost for the micropayment system is hard to achieve. In addition, the micropayment schemes of the signature type needs more computational costs for calculation and transmission.

As a result, there is an essential need to provide a new micropayment scheme with balancing efficiency and safety according to the characteristics of on-line bargains for the industry to reduce the computational costs and storage costs thereof.

SUMMARY OF THE INVENTION

The primary objective of this invention is to provide a system for micropayment with varying denomination. The micropayment system is performed according to a service-device issue mode and comprises a payment terminal, a collection terminal, and a service device. The payment terminal transmits a request to the service device so that the service device generates token data in response to the request and transmits the token data to the payment terminal. After the payment terminal transmits the token data to the collection terminal, the payment terminal generates a token in response to a currency value and transmits it to the collection terminal. The collection terminal asks the service device to exchange the token for the currency value, while the service device exchanges the currency value to the collection terminal and retrieves the currency value from the payment terminal.

The token data comprises a public information, a number base parameter, a bit parameter, and a root, which is calculated by the service device by inputting a secret value and the public information to a merged one-way hash function, wherein both the number base parameter and the bit parameter are positive integral variables depending on the request and greater than one.

Another objective of this invention is to provide a system for micropayment with varying denomination. The micropayment system is performed according to an authorized issue mode and comprises a payment terminal, a collection terminal, and a service device. The payment terminal transmits an authorized application to the service device so that the service device generates a service-device signature in response to the authorized application and transmits the service-device signature to the payment terminal. The payment terminal generates token data in response to the service-device signature and transmits the token data to a collection terminal. Then, the payment terminal generates a token in response to a currency value and transmits it to the collection terminal. The collection terminal asks the service device to exchange the token for the currency value, while the service device exchanges the currency value to the collection terminal and retrieves the currency value from the payment terminal.

The token data comprises a public information, a number base parameter, a bit parameter, and a root, which is calculated by the service device by inputting a secret value and the public information to a merged one-way hash function, wherein both the number base parameter and the bit parameter are positive integral variables depending on the authorized application and greater than one.

Yet a further objective of this invention is to provide a method for micropayment with varying denomination. The method is performed according to a service-device issue mode and comprises the following steps: transmitting a request to a service device so that the service device generates a secret value and token data in response to the request, wherein the token data comprises a public information, a number base parameter, a bit parameter, and a root which is calculated by the service device by inputting a secret value and the public information to a merged one-way hash function, wherein both the number base parameter and the bit parameter are positive integral variables depending on the request and greater than one; transmitting the token data to a collection terminal by the payment terminal; calculating a token in response to a currency value by inputting the public information to a merged one-way hash function by the payment terminal; transmitting the token and the currency value to the collection terminal by the payment terminal; and verifying whether the token is equal to the currency value by inputting the public information and the root of the payment terminal to the merged one-way hash function by the collection terminal.

Yet a further objective of this invention is to provide a computer readable medium that stores a computer program for executing the aforementioned method. A further objective of this invention is to provide a computer program for executing the aforementioned method.

Yet another objective of this invention is to provide a method for micropayment with varying denomination. The method is performed according to an authorized issue mode and comprises: generating an authorized application by a payment terminal; transmitting the authorized application to a service device by the payment terminal; generating a service-device signature in response to the authorized application by the service device; generating token data by the payment terminal after receiving the service-device signature from the service device, wherein the token data comprises a public information and a root of the payment terminal, the root of the payment terminal is calculated according to a merged one-way hash function; transmitting the token data to a collection terminal by the payment terminal; calculating a token in response to a currency value by inputting the public information to the merged one-way hash function by the payment terminal; transmitting the token and the currency value to the collection terminal by the payment terminal; verifying whether the token is equal to the currency value by inputting the public information and the root of the payment terminal to the merged one-way hash function by the collection terminal.

Yet another objective of this invention is to provide a computer readable medium that stores a computer program for executing the aforementioned method. A further objective of this invention is to provide a computer program for executing the aforementioned method.

The detailed technology and preferred embodiments implemented for the subject invention are described in the following paragraphs accompanying the appended drawings for those skilled in this field to well appreciate the features of the claimed invention.

DESCRIPTION OF THE PREFERRED EMBODIMENT

The following description discloses a micropayment system of the invention which uses a micropayment scheme with varying denomination first. Later, a method, a computer program product and a computer readable medium for micropayment with varying denomination utilized in the micropayment system will be described in detail.

Figure 1:
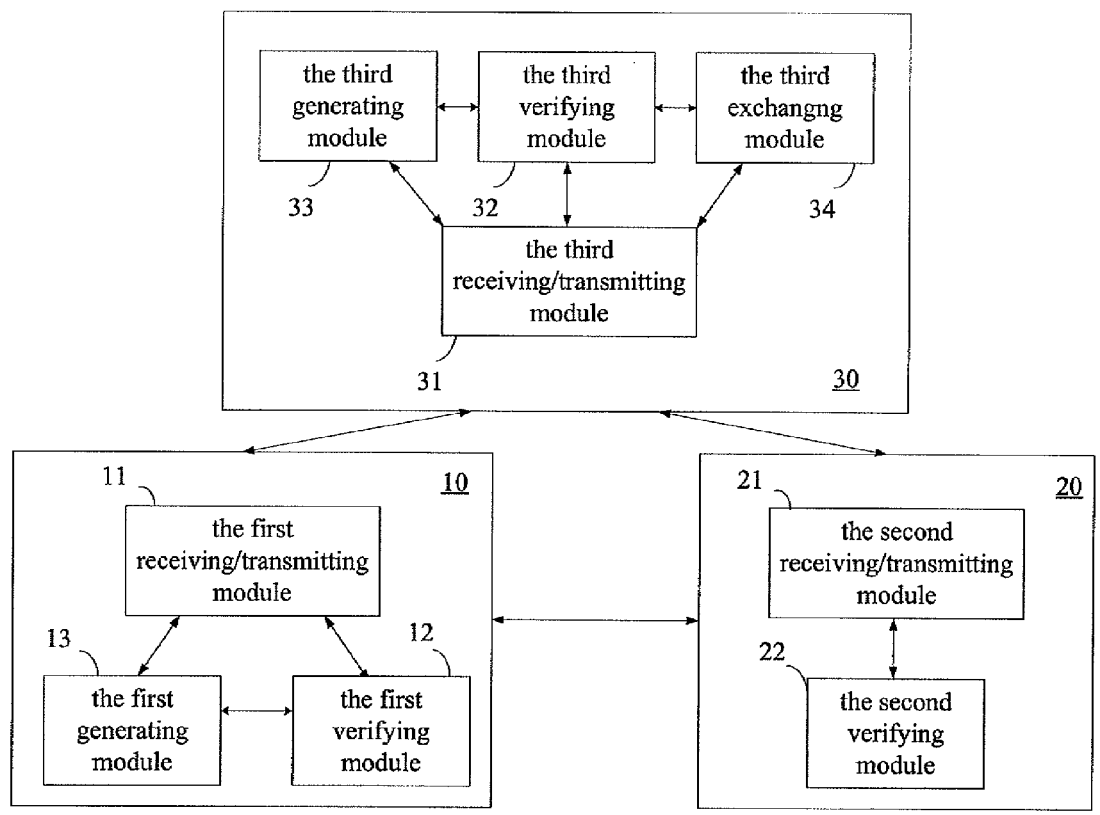
FIG. 1 is a diagram of the micropayment system of the present invention.

Please referring to FIG. 1, a micropayment system of the invention is illustrated. The micropayment system comprises a payment terminal 10, a collection terminal 20 and a service-device 30, wherein the payment terminal 10 maybe a customer, the collection terminal 20 maybe a merchant and a service-device 30 maybe a micropayment service system. The payment terminal 10, the collection terminal 20 and the service-device 30 can connect to each other via a network for on-line bargains. Specifically, the payment terminal 10 of the invention comprises a first transceiving module 11, a first verifying module 12 and a first generating module 13, the collection terminal 20 of the invention comprises a second transceiving module 21 and a second verifying module 22, and the service-device 30 comprises a third transceiving module 31, a third verifying module 32, a third generating module 33 and a third exchanging module 34. The details about those terminals, devices, and modules will be explained in the followings.

The micropayment system disclosed by the invention utilizes a micropayment scheme with varying denomination for the objectives of bargaining safety and reducing the bargaining cost in the meantime.

The micropayment scheme with varying denomination utilizes a merged one-way hash function to encode a token used in the on-line bargain. In addition, the micropayment scheme of the invention uses two variables, a number base parameter and a bit parameter to adjust the currency value of a token so that the micropayment scheme can correspondingly adjust the complex levels of encoding and decoding for on-line bargain. Therefore, the micropayment scheme of the invention can improve the disadvantages of the prior art and enhance the bargaining safety and efficiency. The micropayment scheme with varying denomination of the invention mainly comprises three stages: initializing stage, payment stage, and verifying stage.

Figure 2:
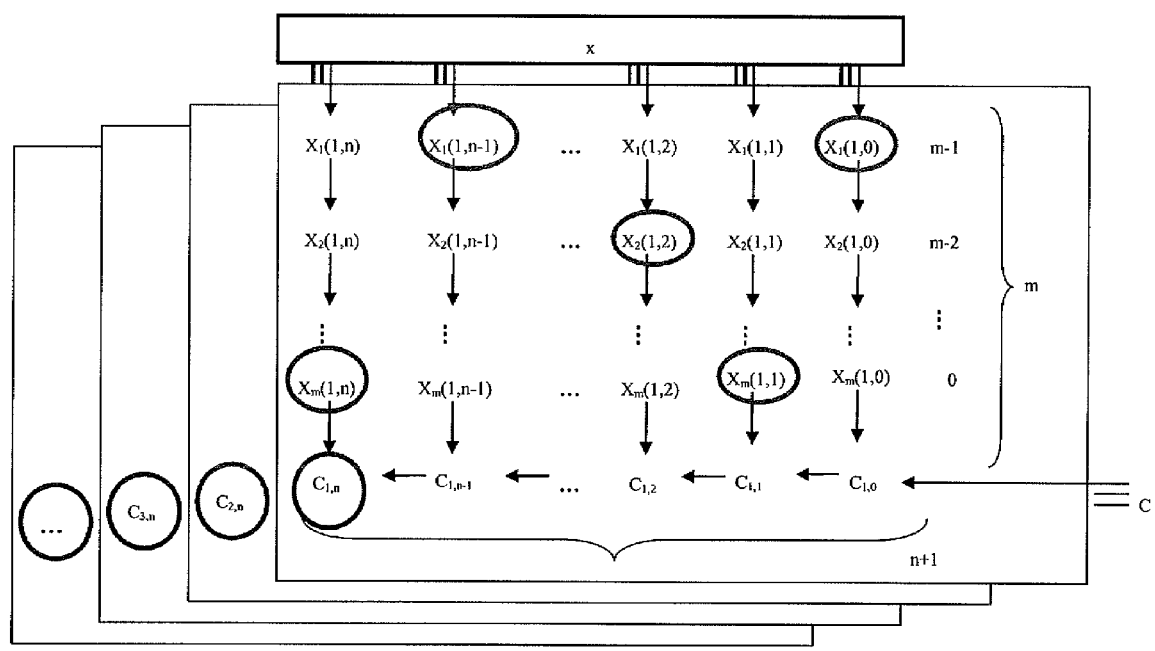
FIG. 2 is a diagram of the micropayment scheme of the present invention.

In the initializing stage, please referring to FIG. 2, a secret value X and a one-way hash function are used to generate a first parameter sequence in the first bargain. The first parameter sequence consists of (N+1) parameters, a zeroth parameter of the first parameter sequence $X_1(1,0)$, a first parameter of the first parameter sequence $X_1(1,1)$, ..., and an Nth parameter of the first parameter sequence $X_1(1,N)$, wherein the numeral N is the bit parameter. In an embodiment, distinct variations on the secret value X, including concatenated variations on the secret value X, are input into the one-way hash function to generate the first sequence parameter. In an embodiment, and as indicated in FIG. 2 by the symbols "∥", concatenated variations on the secret value X are used to generate the zeroth through Nth parameters of the first parameter sequence. Next, every parameter of the first parameter sequence, $X_1(1,0)$, $X_1(1,1)$, ... $X_1(1,N)$, is calculated by individually inputting those parameter to a one-way hash function to generate a second parameter sequence $<X_2(1,0), X_2(1,1), ... X_2(1,N)>$ sequentially. Similarly, generate a third parameter sequence $<X_3(1,0), X_3(1,1), ... X_3(1,N)>$ sequentially by individually inputting each of the parameters of the second parameter sequence to the one-way hash function in sequence until an Mth parameter sequence $<X_M(1,0), X_M(1,1), ... X_M(1,N)>$ is generated, wherein the numeral M is the number base parameter and the sequence $<X_1(1,i), X_2(1,i), ... X_M(1,i)>$ is a one-way hash chain.

It is noted that the parameter sequences after the second parameter sequence (including the second parameter sequence) consists of (N+1) parameters. For example, the Mth parameter sequences consists of a zeroth parameter of the Mth parameter sequence $X_M(1,0)$, a first parameter of the Mth parameter sequence $X_M(1,1)$, ..., and an Nth parameter of the Mth parameter sequence $X_M(1,N)$. Each of the parameters is generated by individually inputting each of the parameters of the previous parameter sequence to the one-way hash function. Therefore, each of the parameters of every parameter sequence has a characteristic of unable to reversely calculate to obtain the parameters of the previous parameter sequence.

Moreover, the number base parameter M and the bit parameter N are positive integral variables greater than one. They can be adjusted according to the amount of money of real bargains so that the calculation time for encoding and decoding during the bargains can be adjusted accordingly for the objectives of bargaining safety and efficiency.

According to the aforementioned, when the Mth parameter sequence is generated after inputting the first parameter sequence to a one-way hash chain, a zeroth root parameter $C_{1,0}$ is generated by inputting a public information C and a zeroth parameter $X_M(1,0)$ of the Mth parameter sequence to the one-way hash function. Next, a first root parameter $C_{1,1}$ is generated by inputting the zeroth root parameter $C_{1,0}$ and a first parameter $X_M(1,1)$ of the Mth parameter sequence to the one-way hash function until an Nth root parameter $C_{1,N}$ is generated by inputting an (N−1)th root parameter $C_{1,N-1}$ and an Nth parameter $X_M(1,N)$ of the Mth parameter sequence to the one-way hash function. The root parameter $<C_{1,0}, C_{1,1}, \ldots C_{1,N}>$ is a one-way hash chain.

It is noted that the present invention sets the Nth root parameter $C_{1,N}$ as a root in the first bargain for providing a certificate to the payment terminal 10, the collection terminal 20 and the service device 30 to confirm whether the token used in the bargain is correct or not. The detailed descriptions about verifying the root during the micropayment process will be explained in the followings. Similarly, the same calculating method is performed as well in the second bargain to generate $C_{2,N}$ as a root. The rest may be deduced by analogy. In the initializing stage, a plurality of roots, including $C_{1,N}$, $C_{2,N}, \ldots C_{i,N}$, can be generated by performing the micropayment scheme with varying denomination of the present invention according to real applications for the following bargains, wherein the numeral "i" is a positive integral variable greater than one to represent the ith bargain.

It is noted that the present invention uses several one-way hash chains to generate a plurality of parameters of several parameter sequences first. Then, a public information cooperating with the parameters in the last parameter sequence are inputted to the one-way hash chain to generate several root parameters until the root for the bargain is obtained. Therefore, compared with the prior art, the micropayment scheme of the invention adopts a merged one-way hash function according to the variables of both the number base parameter and the bit parameter for the objectives of bargaining safety and efficiency.

Next, during the payment stage of the micropayment scheme of the present invention, if a payment terminal must pay "p" dollars to a collection terminal in the ith bargain, it is necessary to transform the numeral "p" into an expression with a proper number base M. That is, the value of the base depends on the amount of money used in the bargain. For example, when the amount of money is small, a binary number base can be used to transform the numeral p into a binary expression. On the other hand, if the money involved is larger, a bigger number base will be used, such as a senary expression. Moreover, after the numeral p has been transformed into an expression with the base M, choose some parameters in the aforementioned parameter sequences correspondingly to generate a token $S_i$ and transmit the token to the collection terminal 20. For example, the token $S_i$ transmitted to the collection terminal 20 is $<X_M(1,N), X_1(1,N-1), \ldots, X_2(1,2), X_M(1,1), X_1(1,0)>$ and the currency value representing this token is:

$$0 \times M^N + (M-1) \times M^{N-1} + \ldots + (M-2) \times M^2 + 0 \times M^1 + (M-1) \times M^0$$

Last, in the verifying stage, after the collection terminal 20 receives the token $S_i$ and the corresponding currency value p, the collection terminal 20 fill the parameters in the token $S_i$ respectively into the positions in the parameter sequences similar the above-mentioned in corresponding to the currency value p with the expression with the base M. The public information C is inputted again to the merged one-way hash function to calculate a root $C'_{1,N}$.

In detail, the token $S_i$ is set as a portion of verifying parameters in the M verifying parameter sequences by the collection terminal 20 corresponding to the currency value p with the expression with the number base M, wherein the each of the verifying parameter sequences includes (N+1) verifying parameters. Next, the portion of verifying parameters in the M verifying parameter sequences are inputted individually to a one-way hash chains for calculation until an Mth verifying parameter sequence is generated.

Subsequently, a zeroth root parameter $C'_{1,0}$ of the collection terminal is generated by inputting a public information C and a zeroth verifying parameter $X'_M(1,0)$ of the Mth verifying parameter sequence to the one-way hash function. Next, a first root parameter $C'_{1,0}$ of the collection terminal is generated by inputting the zeroth root parameter $C'_{1,0}$ of the collection terminal and a first verifying parameter $X'_M(1,1)$ of the Mth verifying parameter sequence to the one-way hash function until an Nth root parameter $C'_{1,N}$ of the collection terminal is generated by inputting an (N−1)th root parameter $C'_{1,N-1}$ of the collection terminal and an Nth verifying parameter $X'_M(1,N)$ of the Mth verifying parameter sequence to the one-way hash function. Set the Nth root parameter $C'_{1,N}$ of the collection terminal as a root of the collection terminal in the first bargain. The rest may be deduced by analogy. The collection terminal 20 can calculate a root $C'_{i,N}$ used in the ith bargain.

Moreover, check whether the root $C'_{i,N}$ calculated by the collection terminal 20 is equal to the root $C'_{i,N}$ received from the payment terminal 10 during the initializing stage. If the root $C'_{i,N}$ is equal to the root $C'_{i,N}$, the payment terminal 10 is thus certified by the collection terminal 20 and the collection terminal 20 will accept the payment from the payment terminal 10 in this bargain. The collection terminal 20 can ask the service device 30 to exchange the token through proper procedures that the payment terminal 10 must pay the amount of money corresponding to the token. In short, the micropayment scheme with varying denomination of the invention uses the roots respectively calculated by the payment terminal and the collection terminal according to an irreversible merged one-way hash chain as a certification for a bargain to check whether they are the same or not.

For example, if the payment terminal 10 must pay 6 dollars to the collection terminal 20, the numeral "6" can be transformed into the binary expression because the numeral "6" is a small number. In addition, in this example, six bits is adopted to express the token. That is, the bit parameter N is 5, the number base parameter M is 2, and the numeral "6" can be shown as the following equation (1):

$$6 = (0,0,0,1,1,0)_2 \tag{1}$$

The sequence $<0, 0, 0, 1, 1, 0>$ can be used as a reference to decide a token S correspondingly. Equation 1

Next, a secret value X can be inputted to a plurality of one-way hash functions to generate M (i.e., 2) parameter sequences, as shown in the table 1:

TABLE 1

| X | | | | | | |
|---|---|---|---|---|---|---|
| $X_1(1,5)$ | $X_1(1,4)$ | $X_1(1,3)$ | $X_1(1,2)$ | $X_1(1,1)$ | $X_1(1,0)$ | 1 |
| $X_2(1,5)$ | $X_2(1,4)$ | $X_2(1,3)$ | $X_2(1,2)$ | $X_2(1,1)$ | $X_2(1,0)$ | 0 |

The token S can be decided as shown in the following equation according to the sequence <0, 0, 0, 1, 1, 0>.

$$S=<X_2(1,5),X_2(1,4),X_2(1,3),X_1(1,2),X_1(1,1),X_2(1,5)> \quad (2)$$

In detail, where the element in the sequence <0, 0, 0, 1, 1, 0> is "0", a parameter in the second rows of table 1 corresponding to the element can be chosen. Similarly, where the element in the sequence <0, 0, 0, 1, 1, 0> is "1", a parameter in the first rows of table 1 corresponding to the element can be chosen. For example, the first element in the sequence <0, 0, 0, 1, 1, 0> is "0". Therefore, the first parameter $X_2(1,5)$ in the second rows of table 1 can be chosen as the first element in the sequence of the token. Accordingly, the whole sequence expression of the token can be shown as the above-mentioned equation (2).

The payment terminal 10 transmits the token data, including the token S (equation (2)) which represents six dollars, the currency value "6", the root $C_{1,5}$, to the collection terminal 20. After receiving the token data, the collection terminal 20 sets the token as a portion of verifying parameters in the M verifying parameter sequences in response to the sequence <0, 0, 0, 1, 1, 0> of the currency value "6" with a binary base, as shown in table 2:

TABLE 2

| | | | $X_1(1,2)$ | $X_1(1,1)$ | | 1 |
|---|---|---|---|---|---|---|
| $X_2(1,5)$ | $X_2(1,4)$ | $X_2(1,3)$ | | | $X_2(1,0)$ | 0 |

In detail, where the element in the sequence <0, 0, 0, 1, 1, 0> is "0", the collection payment 20 fill the corresponding elements of the token S in relative positions of the second row of table 2. Similarly, where the element in the sequence <0, 0, 0, 1, 1, 0> is "1", the collection payment 20 fill the corresponding elements of the token S in relative positions of the first row of table 2. For example, the first element in the sequence <0, 0, 0, 1, 1, 0> is "0". Therefore, the first element $X_2(1,5)$ in the sequence of the token S can be filled in the first position of the second row of table 2 correspondingly. The rest may be deduced by analogy until two verifying parameter sequences can be generated as shown in table 2.

Next, the collection terminal 20 individually inputs each of the verifying parameters in the two verifying parameter sequences in table 2 to the one-way hash chains to generate root parameters until a root $C'_{1,5}$ is generated as shown in table 3.

TABLE 3

| | | | $X_1(1,2)$ | $X_1(1,1)$ | | 1 |
|---|---|---|---|---|---|---|
| $X_2(1,5)$ | $X_2(1,4)$ | $X_2(1,3)$ | $X_2(1,2)$ | $X_2(1,1)$ | $X_2(1,0)$ | 0 |
| $C'_{1,5}$ | $C'_{1,4}$ | $C'_{1,3}$ | $C'_{1,2}$ | $C'_{1,1}$ | $C'_{1,0}$ | C |

Last, the collection terminal 20 checks whether the root $C_{1,5}$ of the payment terminal is equal to its root $C'_{1,5}$.

To sum up, the micropayment system of the invention uses the above-mentioned micropayment scheme for on-line payment. Because the micropayment scheme can use the parameter sequence with different bit parameters and number base parameters corresponding to different the amount of money in the bargain, the bargain can be more rapid than the prior art. In addition, the characteristics of irreversible calculation for the one-way hash function, adopted by the micropayment scheme of the present invention, can ensure the safety of on-line bargains. The following description further explains the micropayment system of the invention and the way of performing the micropayment scheme by the micropayment system.

Please refer to FIG. 1, the payment terminal 10 in the micropayment system of the invention comprises a first transceiving module 11, a first verifying module 12, and a first generating module 13, wherein the first transceiving module 11 is used to receive or transmit data, the first verifying module 12 is used to verify the correctness of the data, such as public keys, private keys or the data used in the micropayment scheme, and the first generating module 13 is used to generate a request or an authorized application for purchasing tokens, generate token data or tokens with the micropayment scheme, or to perform encoding operations, etc. The token data comprises roots calculated by the micropayment scheme for providing certificates for bargains among the payment terminal 10, the collection terminal 20, and the service device 30.

The collection terminal 20 comprises a second transceiving module 21 and a second verifying module 22, wherein the second transceiving module 21 is used to receive or transmit data, and the second verifying module 12 is used to verify the correctness of the data, such as public keys, private keys or the data used in the micropayment scheme.

The service device 30 comprises a third transceiving module 31, a third verifying module 32, a third generating module 33 and a third exchanging module 34, wherein the third transceiving module 31 is used to receive or transmit data, the third verifying module 32 is used to verify the correctness of the data, and the third generating module 33 is used to generate token data or tokens with the micropayment scheme, or to perform encoding operations, etc. The third exchanging module 34 is used to retrieve and pay the money of bargains between the payment terminal 10 and the collection terminal 20.

The following descriptions relate to a method for micropayment with varying denomination of the present invention. The micropayment method has two process types according to the limits of authority for issuing tokens. The first type is a service-device issue mode and the second type is an authorized issue mode. The difference between these modes is that those who have the authority for issuing tokens are different. The detailed description for each mode will be disclosed as the followings.

Figure 3:
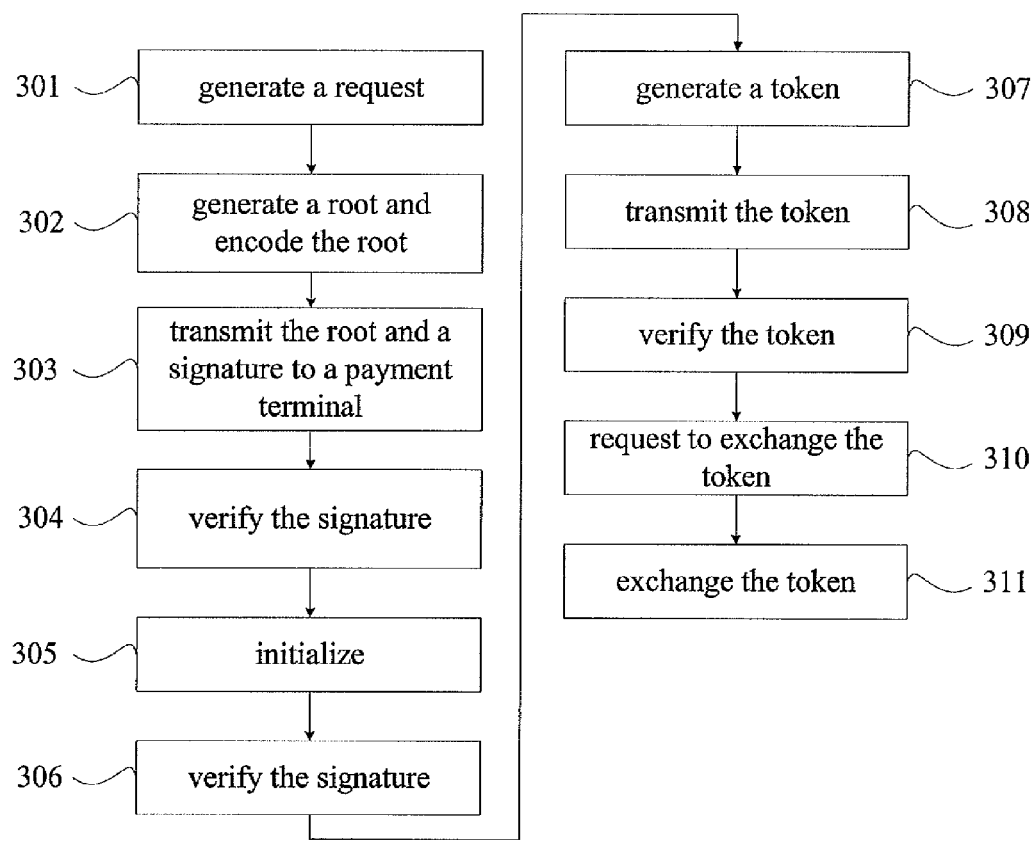
FIG. 3 is a flow chart of the micropayment method with a service-device issue mode of the present invention.

Please refer to FIG. 1 and FIG. 3, wherein FIG. 3 illustrates a method for micropayment with varying denomination with the service-device issue mode. First, it is noted that the payment terminal 10, the collection terminal 20, and the service device 30 of the invention are constructed under a public key infrastructure, wherein they all have a private key and a public key. In detail, the payment terminal 10 comprises a payment-terminal private key and a public payment-terminal key, the collection terminal 20 comprises a collection-terminal private key and a collection-terminal public key, and the service device 30 comprises a service-device private key and a service-device public key. The method comprises the following steps.

In step 301, when a user wants to purchase a token for on-line bargains, the first generating module 13 of the payment terminal 10 generates a request corresponding to the token and the request is received by the third transceiving module 31 of the service device 30 after the first transceiving module 11 transmits the request to the service device 30. The request comprises identifying information of both the payment terminal and the collection terminal and a currency value.

In step 302, the third generating module 33 of the service device 30 generates a secret value X and token data D in response to the request, wherein the token data comprises a public information C, a number base parameter M, a bit parameter N, and a root $C_{i,N}$. The root $C_{i,N}$ is generated by inputting the secret value X and the public information C to the merged one-way hash function as disclosed in the above-mentioned. In a preferred embodiment, the above-mentioned steps can be repeated to obtain a plurality of roots depending on the real application. In addition, the token data D further comprises identifying information of both the payment terminal and the collection terminal and the token data D is encoded by the third generating module 33 of the service-device 30 with a service-device private key signed by an asymmetrical encoding system to generate a service-device signature $Sig_s$.

In step 303, the third transceiving module 31 of the service device 30 transmits the private value X, the token data D and the service-device signature $Sig_s$ to the payment terminal 10. In a preferred embodiment, the service device 30 transmits the private value X to the payment terminal 10 via a safe channel, such as using a digital certificate of a secure socket layer or encoding with a public key of the payment terminal.

In step 304, the first verifying module 12 of the payment terminal 10 verifies the service-device signature $Sig_s$ with the service-device public key and retrieves the secret value X via the safe channel. After verifying the correctness of the service-device signature $Sig_s$, the following steps are conducted.

In step 305, the payment terminal 10 conducts an initializing operation which the transceiving module 11 of the payment terminal 10 transmits the token data D and the service-device signature $Sig_s$ to the collection terminal 20.

In step 306, after the second transceiving module 21 of the collection terminal 20 receives the token data D and the service-device signature $Sig_s$, the second verifying module 22 verifies the service-device signature $Sig_s$ with the service-device public key and conducts the following steps if $Sig_s$ is correct.

In step 307, the payment terminal 10 and the collection terminal 20 begin to bargain. The first generating module 13 of the payment terminal 10 generates a token S by inputting the private value X into the merged one-way hash chains in response to a currency value.

In step 308, the first transceiving module 11 of the payment terminal 10 transmits the token S to the collection terminal 20 and the token is received by the second transceiving module 21.

In step 309, the second verifying module 22 of the collection terminal 20 inputs the public information C and the token S to the merged one-way hash chains to verify whether the token S is equal to the currency value or not. If the token S is equal to the currency value, the token and the currency value are saved. In detail, the second verifying module 22 of the collection terminal 20 generates the root $C'_{i,N}$ by inputting the public information C and the token S to the merged one-way hash chains for calculation and check whether the root $C'_{i,N}$ is equal to the root $C_{i,N}$ received from the payment terminal 10 in the initializing stage. If the root $C'_{i,N}$ is equal to the root $C_{i,N}$, it means the token S is correct and the token S can be exchanged by the service device 30 or be saved. After several tokens, such as $S_1$, $S_2$ . . . , are saved for different bargains, those tokens can be gathered and then be exchanged by the service device 30.

In step 310, exchange the token. The second transceiving module 21 of the collection terminal 20 transmits the token S, the token data D, and the service-device signature $Sig_s$ to the service device 30, the third verifying module 32 verifies the service-device signature $Sig_s$ with the service-device public key and conducts the following steps if $Sig_s$ is correct.

In step 311, the third verifying module 32 of the service device 30 inputs the token data D and the secret value X to the merged one-way hash chains to verify whether the token S is equal to the currency value or not. If the token S is equal to the currency value, the third exchanging module 34 exchanges the token to the collection terminal 20 and retrieves the money in response to the currency value from the payment terminal 10.

Figure 4:
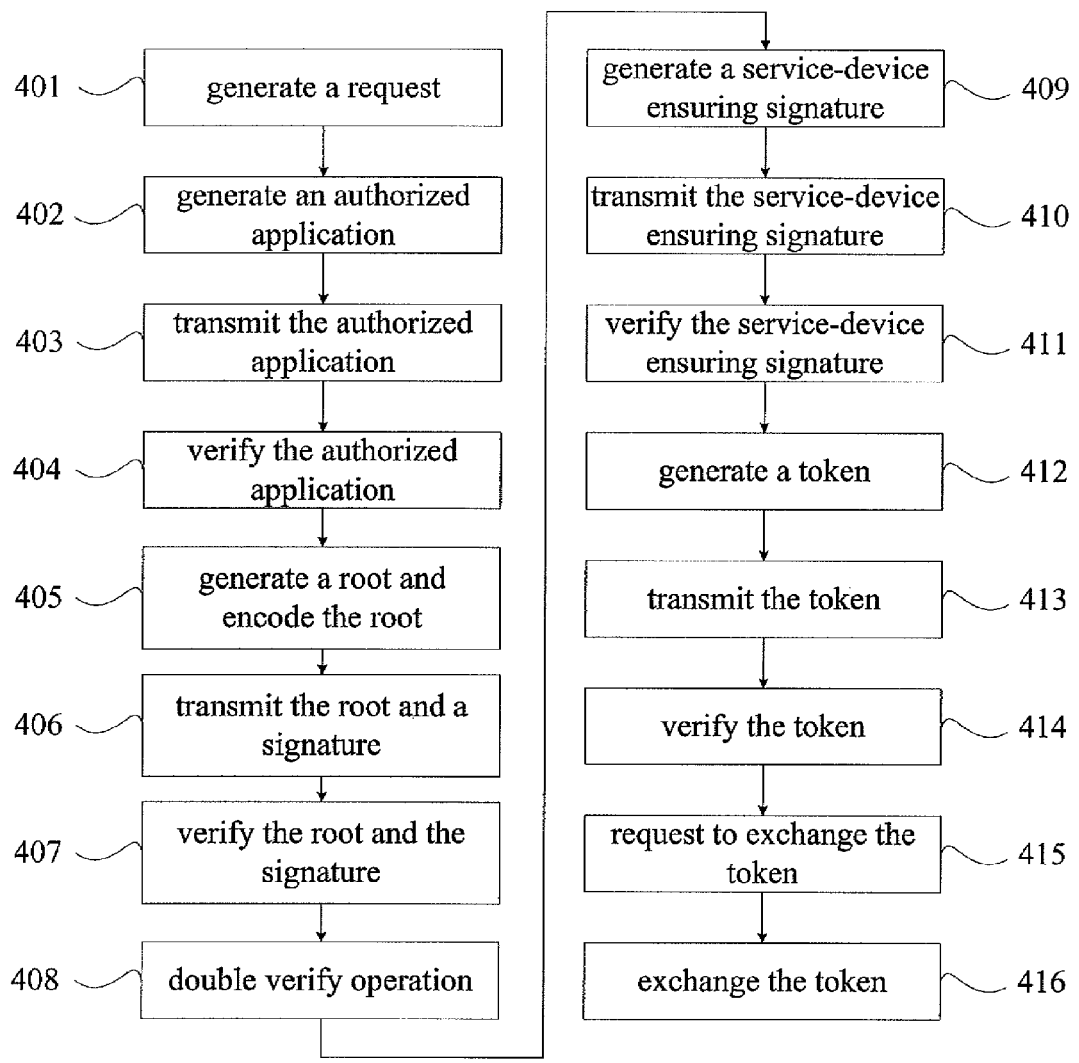
FIG. 4 is a flow chart of the micropayment method with an authorized issue mode of the present invention.

Please refer to FIG. 4, which illustrates a method for micro-payment with varying denomination with the authorized issue mode. As the above-mentioned, the payment terminal 10, the collection terminal 20, and the service device 30 of the invention are constructed under a public key infrastructure, wherein they all have a private key and a public key. The detail description can be referred to the above mention. The method comprises the following steps.

In step 401, the first generating module 13 of the payment terminal 10 generates an authorized application W, including the tokens with a desired amount and their purposes. The first transceiving module 11 transmits the authorized application W and the payment-terminal identifying information to the service device 30.

In step 402, after the third transceiving module 31 of the service device 30 receives the authorized application W, the third generating module 33 generates service-device signature $Sig_s$ in response to the authorized application W. In a preferred embodiment, the third generating module 33 encodes the authorized application W and the payment-terminal identifying information with a service-device private key signed by an asymmetrical encoding system to generate the service-device signature $Sig_s$.

In step 403, the third transceiving module 31 of the service device 30 transmits the service-device signature $Sig_s$ to the payment terminal 10 to inform the payment terminal 10 the quota of the token which is authorized.

In step 404, after the first transceiving module 11 of the payment terminal 10 receives the service-device signature $Sig_s$, the first verifying module 12 verifies the service-device signature $Sig_s$ with the service-device public key.

In step 405, the payment terminal 10 conducts an initializing operation which the first generating module 13 of the payment terminal 10 generates token data D in response to the service-device signature $Sig_s$, wherein the token data D comprises a public information C and a root $C_{i,N}$ generated by inputting a secret value X and the public information C to the merged one-way hash chain for calculation as disclosed in the above-mentioned. In a preferred embodiment, the token data D further comprises identifying information of both the payment terminal and the collection terminal, a number base number M, and a bit number N, wherein the number base number M and the bit number N depend on the authorized application W. In addition, the first generating module 13 of the payment terminal 10 generates a payment-terminal signature $Sig_c$ by signing the token data D with a payment-terminal private key.

In step 406, the second transceiving module 21 of the collection terminal 20 receives the token data D and the payment-terminal signature $Sig_c$ which are transmitted by the first transceiving module 11 of the payment terminal 10.

In step 407, after the second transceiving module 21 of the collection terminal 20 receives the token data D and the payment-terminal signature $Sig_c$, the second verifying module 22 of the collection terminal 20 verifies the payment-terminal signature $Sig_c$ with the payment-terminal public key.

In step 408, the collection terminal 20 conducts a double verifying operation. The second transceiving module 21 of the collection terminal 20 transmits the token data D and the payment-terminal signature $Sig_c$ to the service device 30. After the third transceiving module 31 of the service device 30 received it, the third verifying module 32 encodes the payment-terminal signature $Sig_c$ with the payment-terminal public key. The purpose of the double verifying operation is to ensure that the payment is still within the budget authorized by the service device and the collection terminal can accept the payment terminal as a bargainer.

In step 409, if the service device 30 confirms that the payment terminal 10 is its authorized party and the token data D conforms to its authorized budget, the service device 30 generates a service-device ensuring signature $Sig_{sc}$ by signing the payment-terminal signature $Sig_c$ and the token data D with a service-device private key. The service-device ensuring signature $Sig_{sc}$ is used to provide a certificate for the bargains between the payment terminal 10 and the collection terminal 20.

In step 410, the third transceiving module 31 of the service device 30 transmits the service-device ensuring signature $Sig_{sc}$ to the collection terminal 20.

In step 411, after the second transceiving module 21 of the collection terminal 20 received it, the second verifying module 22 verifies the service-device ensuring signature $Sig_{sc}$ with the service-device public key.

In step 412, the payment terminal 10 and the collection terminal 20 begin to bargain. The first generating module 13 of the payment terminal 10 generates a token S by inputting the private value X and the public information C to the merged one-way hash chains in response to a currency value.

In step 413, the first transceiving module 11 of the payment terminal 10 transmits the token S to the collection terminal 20.

In step 414, after the second transceiving module 21 of the collection terminal 20 receives the token and the corresponding currency value, the second verifying module 22 of the collection terminal 20 inputting the public information C and the token S to the merged one-way hash chains to verify whether the token S is equal to the currency value or not. If the token S is equal to the currency value, the token and the currency value are saved. In detail, the second verifying module 22 of the collection terminal 20 generates the root $C'_{i,N}$ by calculating the public information C and the token S according to the merged one-way hash chains and check whether the root $C'_{i,N}$ is equal to the root $C_{i,N}$ received from the payment terminal 10 in the initializing stage. If the root $C'_{i,N}$ is equal to the root $C_{i,N}$, it means the token S is correct and the token S can be exchanged by the service device 30 or be saved. After several tokens, such as $S_1$, $S_2$ . . . , are saved for different bargains, those tokens can be gathered and then be exchanged by the service device 30.

In step 415, exchange the token. The second transceiving module 21 of the collection terminal 20 transmits the token S, the token data D, and the service-device ensuring signature $Sig_{sc}$ to the service device 30, the third verifying module 32 verifies the service-device ensuring signature $Sig_{sc}$ with the service-device public key.

In step 416, the third verifying module 32 verifies whether the token S conforms to the budget authorized by the service device 30 when service-device ensuring signature $Sig_{sc}$ is verified to be correct. If the token S is within the authorized budget, the third exchanging module 34 exchanges the token to the collection terminal 20 and retrieves the money in response to the currency value from the payment terminal 10.

The aforementioned methods can be physically implemented by using a computer program product. In other words, computer apparatuses having network transmission ability are installed with an appropriate computer program product for executing aforementioned steps. This invention can also utilize a computer readable medium to store a computer program for executing aforementioned steps. The computer readable medium can be a floppy disk, a hard disk, an optical disc, a flash disk, a tape, a database accessible from a network, or a storage medium with the same functionality that can be easily thought by people skilled in this field.

The above disclosure is related to the detailed technical contents and inventive features thereof. Those skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for micropayment with varying denomination, comprising:

transmitting, by a payment terminal, a request to a service device, wherein the request includes a currency value;

generating, by the service device, a secret value and token data in response to the request;

wherein the token data comprises a public information, a root of the payment terminal, a numeral base parameter M, and a numeral bit parameter N;

wherein generating the token data further comprises calculating the root of the payment terminal by performing the following steps:

generating M parameter sequences by performing the following steps:

(i) generating a first parameter sequence by individually inputting N+1 distinct variations of the secret value into a one-way hash function, wherein the first parameter sequence consists of (N+1) parameters;

(ii) generating a second parameter sequence by individually inputting each of the parameters of the first parameter sequence to said one-way hash function;

(iii) generating a third parameter sequence by individually inputting each of the parameters of the second parameter sequence to said one-way hash function;

(iv) generating a plurality of $i^{th}$ parameter sequences for each numeral i between three and M, wherein each $i^{th}$ parameter sequence is generated by individually inputting each of the parameters of the $(i-1)^{th}$ parameter sequence to said one-way hash function;

(v) generating an $M^{th}$ parameter sequence by individually inputting each of the parameters of the $(M-1)^{th}$ parameter sequence to said one-way hash function;

generating a zero$^{th}$ root parameter by inputting the public information and a zero$^{th}$ parameter of the $M^{th}$ parameter sequence to said one-way hash function;

generating a first root parameter by inputting the zero$^{th}$ root parameter and a first parameter of the M$^{th}$ parameter sequence to said one-way hash function;

generating a plurality of j$^{th}$ root parameters for each numeral j between one and N, wherein each j$^{th}$ root parameter is generated by inputting a (j−1)$^{th}$ root parameter and a j$^{th}$ parameter of the M$^{th}$ parameter sequence to said one-way hash function; and generating an N$^{th}$ root parameter by inputting an (N−1)$^{th}$ root parameter and an N$^{th}$ parameter of the M$^{th}$ parameter sequence to said one-way hash function;

wherein the N$^{th}$ root parameter is the root of the payment terminal;

receiving, by the payment terminal, the secret value and the token data from the service device;

transmitting, by the payment terminal, the token data to a collection terminal;

transforming, by the payment terminal, the currency value into a numerical expression having N digits and base M, wherein M is said numeral base parameter M, and N is said numeral bit parameter N;

generating, by the payment terminal, said M parameter sequences by performing the steps (i)-(v);

calculating, by the payment terminal, a token by selecting N parameters from the M parameter sequences, wherein each parameter of the selected N parameters corresponds to a different one of said N digits, wherein the token is a collection of the selected N parameters;

transmitting, by the payment terminal, the token and the currency value to the collection terminal; and verifying, by the collection terminal, whether the token is equal to the currency value by inputting the public information and the selected N parameters of said token to the merged one-way hash function.

\* \* \* \* \*